US010023077B1

(12) United States Patent
Stutika et al.

(10) Patent No.: US 10,023,077 B1
(45) Date of Patent: Jul. 17, 2018

(54) TRACK ASSEMBLY

(71) Applicant: Lear Corporation, Southfield, MI (US)

(72) Inventors: Peter Stutika, Presov (SK); Peter Necej, Presov (SK); Peter Palascak, Presov (SK); Miroslav Dedina, Presov (SK); Michael Wojatzki, Ennigerloh (DE); Marian Podhorsky, Presov (SK); Norbert Hertling, Munich (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/477,449

(22) Filed: Apr. 3, 2017

(51) Int. Cl.
F16M 13/00 (2006.01)
B60N 2/24 (2006.01)
B60N 2/07 (2006.01)

(52) U.S. Cl.
CPC .............. B60N 2/24 (2013.01); B60N 2/0722 (2013.01)

(58) Field of Classification Search
CPC ...... B60N 2/08; B60N 2/0881; B60N 2/0893; B60N 2/24; B60N 2/0722; B60N 2/0818; B60N 2/0825
USPC ........................ 248/521, 125.7; 403/164–165
See application file for complete search history.

(56) References Cited

U.S. PATENT DOCUMENTS

| 4,579,473 | A | * | 4/1986 | Brugger | F16C 11/00 24/297 |
| 4,949,932 | A | * | 8/1990 | Terai | B60N 2/0705 248/393 |
| 5,647,681 | A | * | 7/1997 | Chen | B23K 31/02 256/59 |
| 6,036,267 | A | | 3/2000 | Downey et al. | |
| 8,770,534 | B2 | | 7/2014 | Nakamura et al. | |
| 2009/0114793 | A1 | * | 5/2009 | Brewer | B60N 2/0705 248/429 |
| 2013/0056604 | A1 | * | 3/2013 | Hayashi | B60N 2/0705 248/429 |
| 2013/0119221 | A1 | * | 5/2013 | Hayashi | B60N 2/0705 248/429 |
| 2014/0042289 | A1 | | 2/2014 | Kawano | |
| 2014/0277490 | A1 | * | 9/2014 | Perloff | A61F 2/442 623/17.16 |
| 2015/0069202 | A1 | * | 3/2015 | Hayashi | B60N 2/08 248/429 |
| 2015/0090854 | A1 | * | 4/2015 | Hayashi | B60N 2/0705 248/429 |

* cited by examiner

Primary Examiner — Christopher Garft
(74) Attorney, Agent, or Firm — Fishman Stewart PLLC

(57) ABSTRACT

A track assembly includes a first pair of tracks, a first lockset that may be configured to selectively restrict movement of the first pair of tracks, a second pair of tracks, a second lockset that may be configured to selectively restrict movement of the second pair of tracks, and a cross member that may be connected between the first pair of tracks and the second pair of tracks. The cross member may be configured to actuate the first lockset and the second lockset. The cross member may include a first section and a second section. The first section and the second section may be configured to rotate relative to each other.

14 Claims, 8 Drawing Sheets

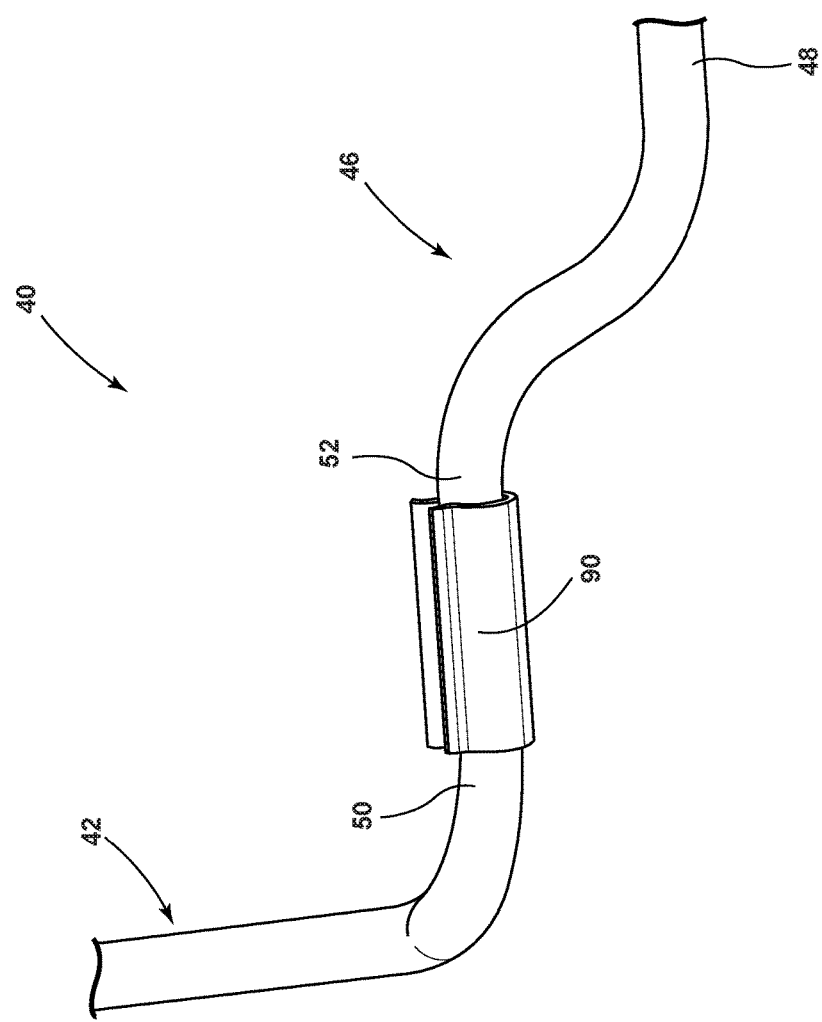

TRACK ASSEMBLY

TECHNICAL FIELD

The present disclosure generally relates to track assemblies that may be used, for example, in connection with vehicle seats.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Track adjusters can be used in connection with vehicle seats. A track adjuster may include a cross member/actuation handle that may actuate a locking device of the track adjuster to allow sliding movement of a vehicle seat. In some circumstances, such as vehicle crashes and/or uneven mounting, a cross member/actuation handle may inadvertently actuate a locking device.

There is therefore a desire for solutions/options that minimize or eliminate one or more of the above-described challenges. The foregoing discussion is intended only to illustrate examples of the present field and should not be taken as a disavowal of scope.

SUMMARY

In embodiments, a track assembly may include a first pair of tracks, a first lockset that may be configured to selectively restrict movement of the first pair of tracks, a second pair of tracks, a second lockset that may be configured to selectively restrict movement of the second pair of tracks, and/or a cross member that may be connected between the first pair of tracks and the second pair of tracks. The cross member may be configured to actuate the first lockset and the second lockset. The cross member may include a first portion and a second portion. The first portion and the second portion may be configured to rotate relative to each other. The first portion may be connected with the second portion via a pin. The pin may be disposed at least partially in the first portion and at least partially in the second portion. At least one of the first portion and the second portion may be configured to rotate about the pin. The first portion may be connected with the second portion via a bearing and the pin. A narrow section of the pin may be disposed in the bearing and a wide section of the pin is disposed in the second portion. The pin may be a separate, unitary component or may be integrally formed with the first portion or the second portion. A bearing may be disposed at least partially in the first portion and the pin may be disposed at least partially in the second portion. A bearing may include a collar disposed between the first portion and the second portion.

In embodiments, a cross member may include a first portion that may be configured to engage a first lockset of a first pair of tracks, a second portion that may be configured to engage a second lockset of a second pair of tracks, and/or a third portion that may connect the first portion and the second portion. The third portion may include a first section and a second section that may be configured to rotate relative to each other. The first section and the second section may be connected via a pin. The pin may be disposed at least partially in the first portion and at least partially in the second portion. The first portion and the second portion may be configured to rotate about the pin. The first portion may be connected with the second portion via a bearing and the pin. A narrow section of the pin may be disposed in the bearing. A wide section of the pin may be disposed in the second section of the third portion of the cross member. The bearing may be disposed at least partially in the first section and the pin may be disposed at least partially in the second section. The bearing may include a collar disposed at least partially between (e.g., axially) the first section and the second section. The first portion, the second portion, and the third portion may be connected in a generally U-shaped configuration. The first portion, the second portion, and/or the third portion may be substantially hollow.

Various aspects of the present disclosure will become apparent to those skilled in the art from the following detailed description of the various embodiments, when read in light of the accompanying drawings.

BRIEF DESCRIPTION OF THE DRAWINGS

FIG. 3B is a perspective view generally illustrating portions of an embodiment of a cross member in accordance with teachings of the present disclosure.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure.

Figure 1:
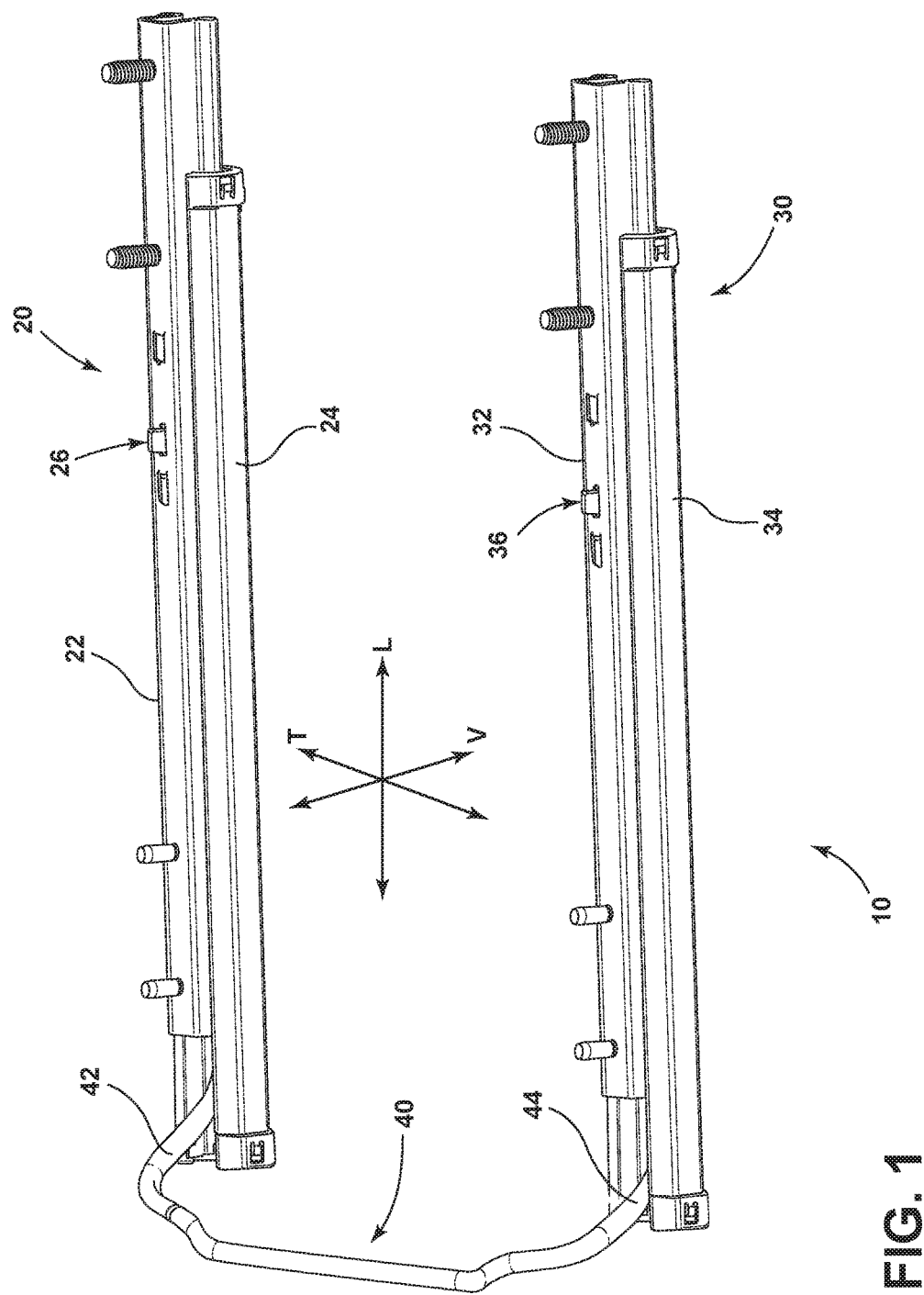
FIG. 1 is a perspective view generally illustrating an embodiment of a track assembly in accordance with teachings of the present disclosure.

In embodiments, such as generally illustrated in FIG. 1, a track assembly 10 may include a first pair of tracks 20, a first lockset 26 associated with first pair of tracks 20, a second pair of tracks 30, a second lockset 36 associated with the second pair of tracks 30, and/or a cross member 40. First lockset 26 may be configured to selectively lock a first track 22 of the first pair of tracks 20 relative to a second track 24 of the first pair of tracks 20. The second lockset 36 may be configured to selectively lock a first track 32 of the second pair of tracks 30 relative to a second track 34 of the second pair of tracks 30. Cross member 40 may be configured as a handle, as a towel bar, and/or to be actuated by a user. For example, and without limitation, cross member 40 may be configured to control engagement and/or disengagement of first lockset 26 and/or second lockset 36 (e.g., locking/unlocking of pairs of tracks 20, 30).

Figure 2:
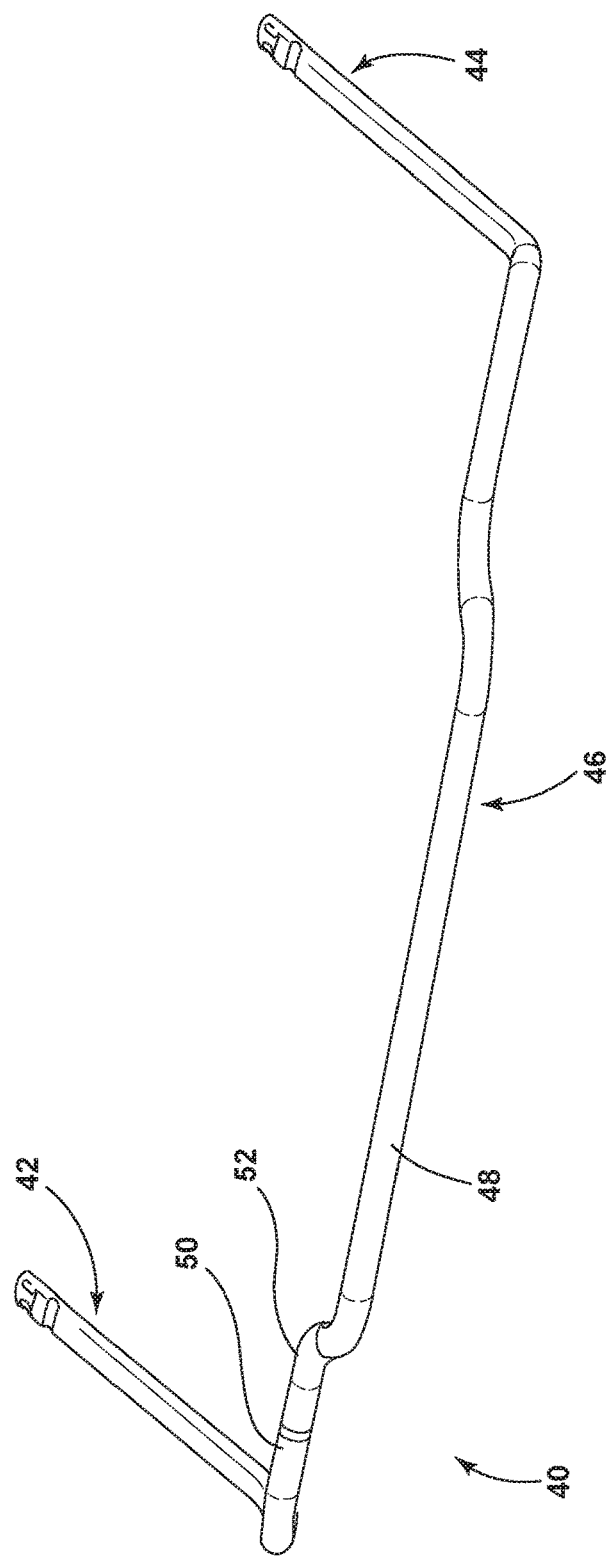
FIG. 2 is a perspective view generally illustrating an embodiment of a cross member in accordance with teachings of the present disclosure.
Figure 3A:
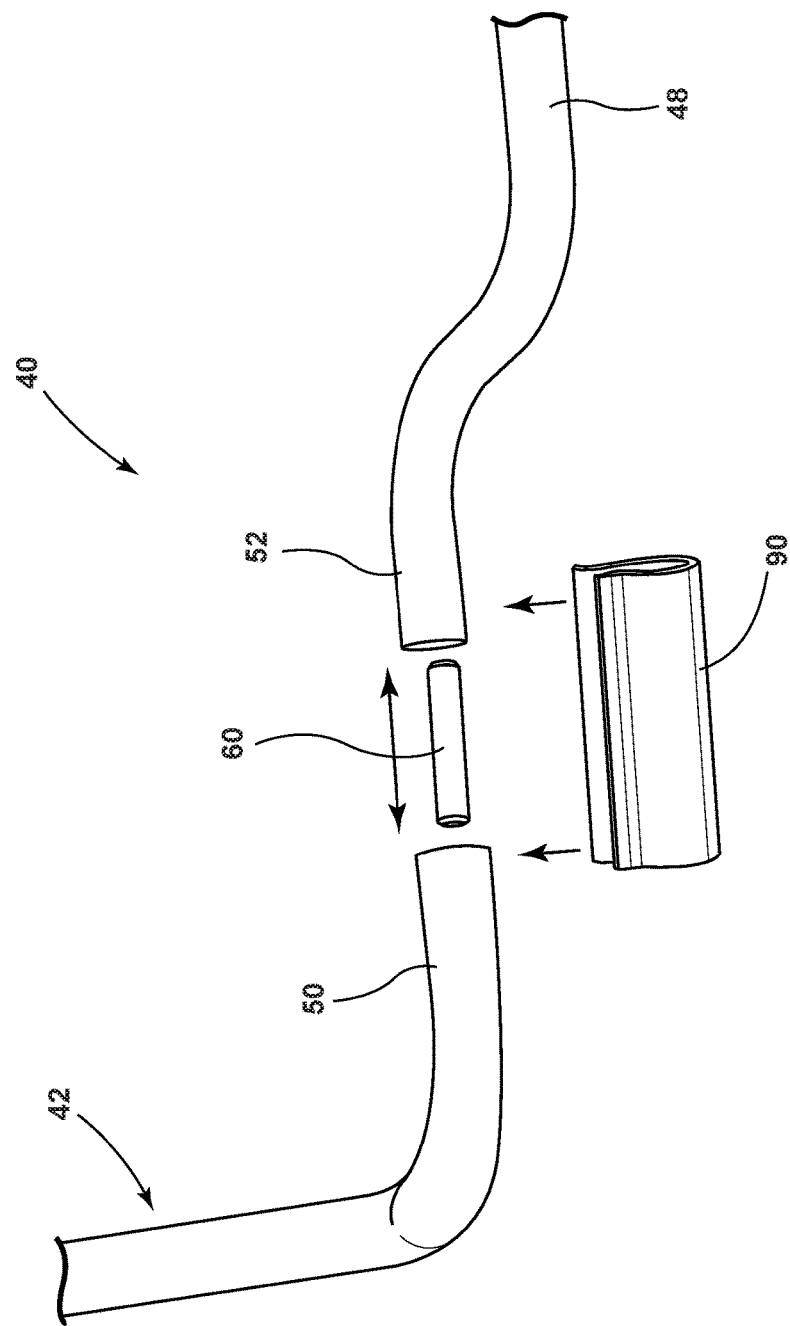
FIG. 3A is an exploded perspective view generally illustrating portions of an embodiment of a cross member in accordance with teachings of the present disclosure.

With embodiments, such as generally illustrated in FIGS. 1 and 2, cross member 40 may include a first portion 42, a second portion 44, and/or a third portion 46. First portion 42 may be configured to control, at least in part, engagement and/or disengagement of first lockset 26 (e.g., locking/unlocking of first pair of tracks 20). Second portion 44 may be configured to control, at least in part, engagement and/or disengagement of second lockset 36 (e.g., locking/unlocking of second pair of tracks 30). First portion 42 and/or second portion 44 may be disposed generally in parallel with a longitudinal direction L. Third portion 46 may be disposed generally perpendicular to the longitudinal direction L and/or generally parallel with a transverse direction T. Third portion 46 may connect first portion 42 with second portion 44, and/or first portion 42, second portion 44, and third portion 46 may be connected in a generally U-shaped configuration. Third portion 46 may extend, at least to some degree, in a vertical direction V and/or the longitudinal direction L such that third portion 46 may extend longitudinally beyond and/or above first portion 42 and/or second portion 44. Third portion 46 may include an extension 48 that may extend farther vertically and/or horizontally (e.g., in the longitudinal direction L) than the rest of third portion 46.

Referring to FIGS. 2, 3A, 3B, 4A, 4B, and 5, in embodiments, third portion 46 of cross member 40 may include a first section 50 and/or a second section 52. First section 50 and second section 52 may be configured to rotate relative to each other, at least to some degree (e.g., third portion 46 may be split). For example, and without limitation, first section 50 and second section 52 may be connected to each other via a connecting member 60. Connecting member 60 may include, for example, a pin, and connecting member 60 may be referred to herein as pin 60, but connecting member 60 is not limited to a pin. Pin 60 may include one or more of a variety of shapes, sizes, configurations, and/or materials. For example, and without limitation, pin 60 may include a generally cylindrical configuration and may include an outer diameter that is smaller than an inner diameter of first section 50 and/or second section 52. Pin 60 may be disposed (e.g., press fit) at least partially in first section 50 and/or at least partially in second section 52. For example, and without limitation, about half of pin 60 may be disposed in first section 50 and about half of pin 60 may be disposed in second section 52. With embodiments, pin 60 may be a separate, unitary component or, in embodiments, may be integrally formed with first section 50 and/or second section 52.

Figure 4A:
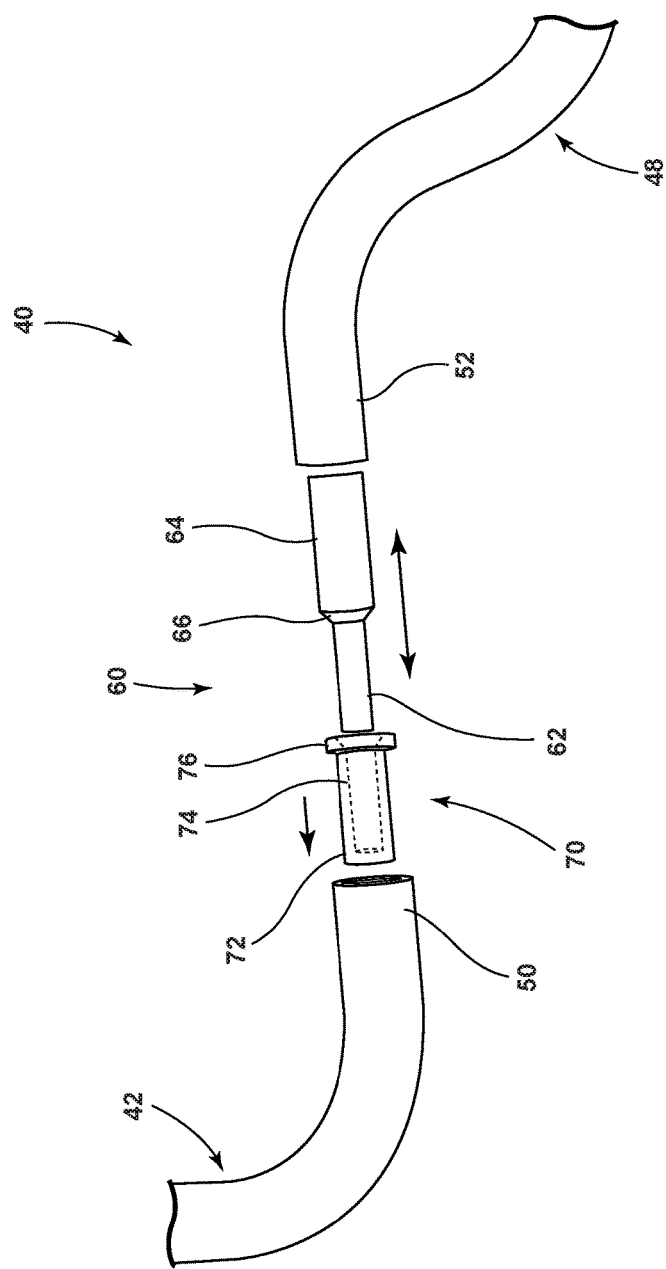
FIG. 4A is an exploded perspective view generally illustrating portions of an embodiment of a cross member in accordance with teachings of the present disclosure.
Figure 4B:
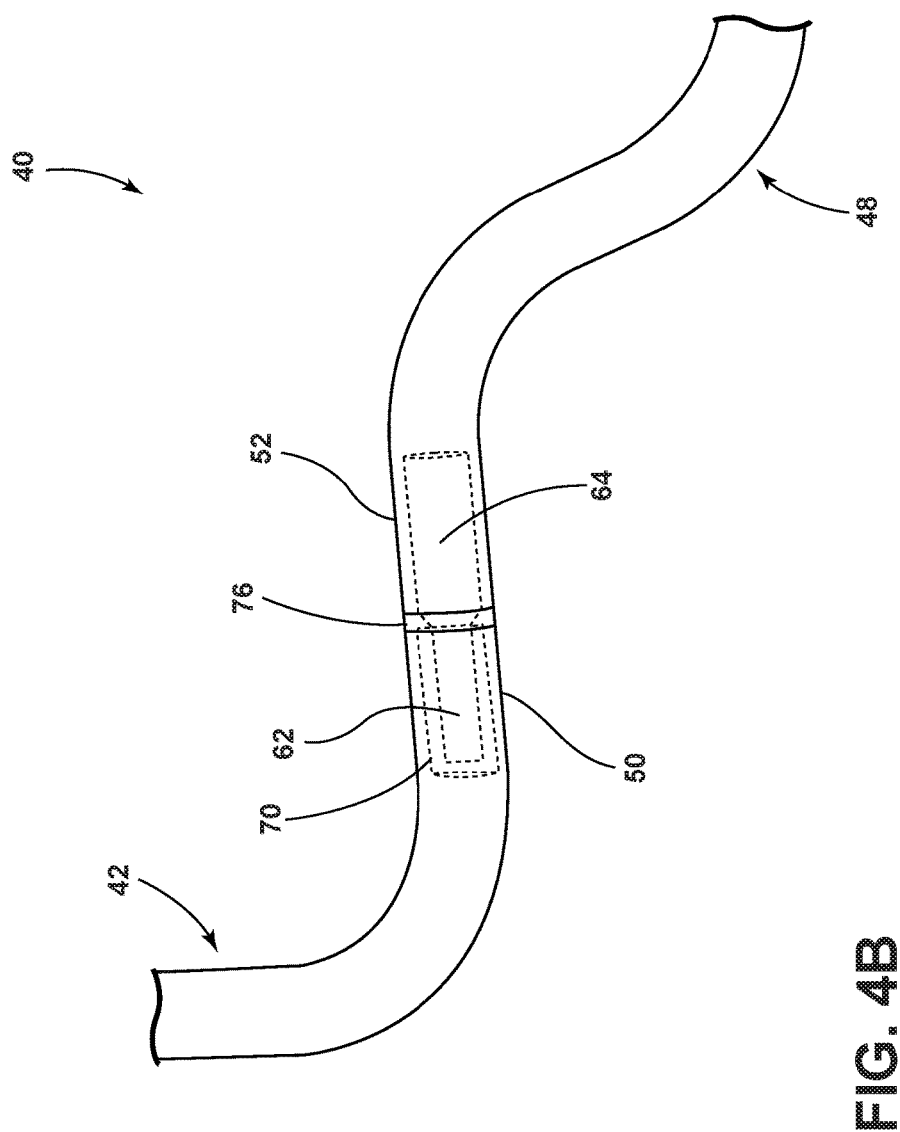
FIG. 4B is a perspective view generally illustrating portions of an embodiment of a cross member in accordance with teachings of the present disclosure.
Figure 5:
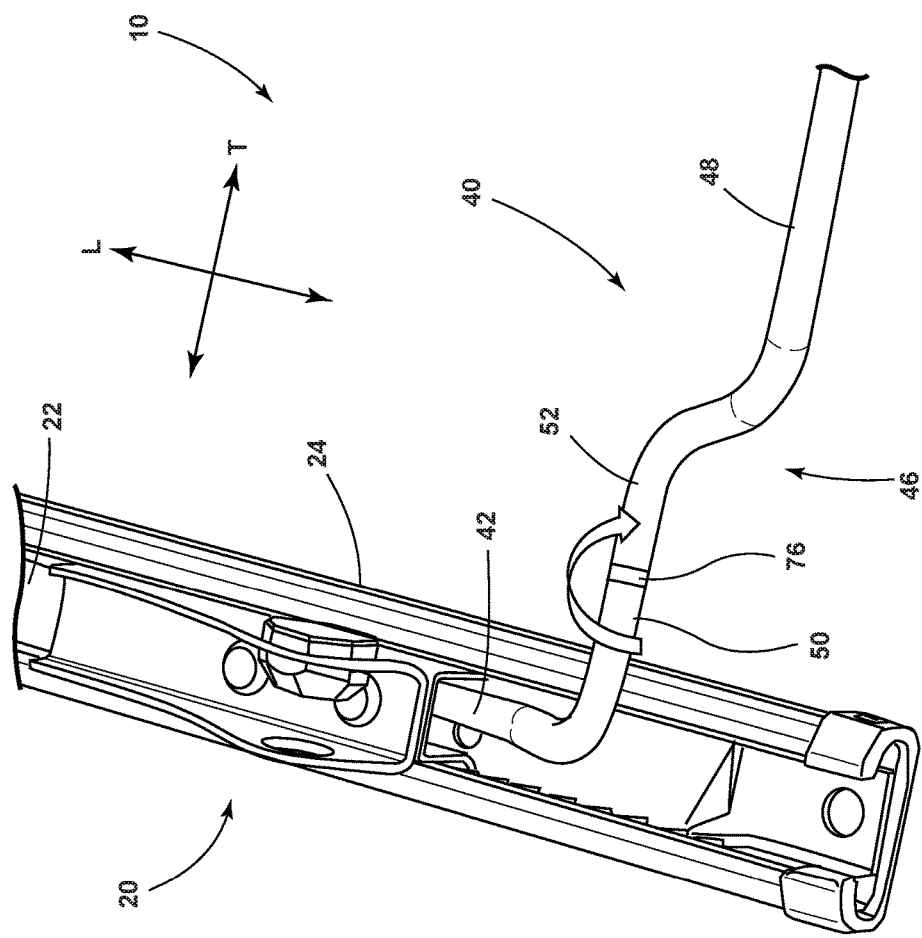
FIG. 5 is a perspective view generally illustrating portions of an embodiment of a track assembly in accordance with teachings of the present disclosure.

As generally illustrated in FIGS. 4A, 4B, and 5, in embodiments, cross member 40 may include a bearing/bushing 70. Bearing 70 may include one or more of a variety of shapes, sizes, configurations, and/or materials. For example, and without limitation, bearing 70 may include a generally cylindrical configuration and may include plastic. Bearing 70 may include, for example, a cylindrical body 72 and/or a collar 74 that may be disposed at an end of bearing 70. Body 72 may be configured for insertion into first section 50 and/or second section 52, such as via a press/interference fit. Collar 76 may include a larger diameter than body 72 and/or be configured to limit an insertion depth of bearing 70 into first section 50 and/or second section 52. An outer diameter of collar 76 may, for example, be about the same as an outer diameter of first section 50 and/or second section 52. Body 72 may include a recess/aperture 74 that may be configured to receive at least a portion of pin 60. Pin 60 may include a narrow section 62 and/or a wide section 64. Narrow section 62 and wide section 64 may or may not be about the same length. Recess/aperture 74 of bearing 70 may be configured to receive narrow section 62, and/or narrow section 64 may be press/interference fit into recess/aperture 74. Wide section 64 of pin 60 may include a larger diameter than narrow section 62 and may be configured for insertion into first section 50 and/or second section 52, such as via a press/interference fit. For example, and without limitation, in an assembled configuration, such as generally illustrated in FIGS. 4B and 5, body 72 of bearing 70 may be press fit into first section 50 of cross member 40 up to collar 76, narrow section 62 of pin 60 may be press fit into recess 74 of bearing 70 (e.g., such that at least some of narrow section 62 is disposed in first section 50), and/or wide section 64 of pin 60 may be press fit into second section 52 of cross member 40 such that collar 76 is disposed between (e.g., axially) and in contact with first section 50 and second section 52. In another configuration, body 72 of bearing 70 may be press fit into second section 52 up to collar 76, narrow section 62 of pin 60 may be press fit into recess 74 of bearing 70 (e.g., such that at least some of narrow section 62 is disposed in second section 52), and/or wide section 64 of pin 60 may be press fit into first section 50 such that collar 76 is disposed between and in contact with first section 50 and second section 52. Wide section 64 of pin 60 and body 72 of bearing 70 may or may not include about the same diameter. With embodiments, pin 60 may include a tapered transition 66 between narrow section 62 and wide section 64. In embodiments, bearing 70 may be integrally formed with first section 50 and/or or second section 52.

During operation, cross member 40 may be actuated by a user, such as to permit sliding of first tracks 22, 32 relative to second tracks 24, 34, in embodiments. Actuation by a user may include lifting cross member 40 (e.g., vertically upward) via third portion 46 such that first portion 42 and second portion 44 cause disengagement of first and second locksets 26, 36. During such actuation, first section 50 and second section 52 may not move relative to each other, and pin 60 and bearing 70 may not move relative to each other or relative to first and second sections 50, 52 (e.g., forces of regular lifting of cross member 40 may not overcome frictional forces between pin 60, bearing 70, first section 50, and/or second section 52).

Figure 6:
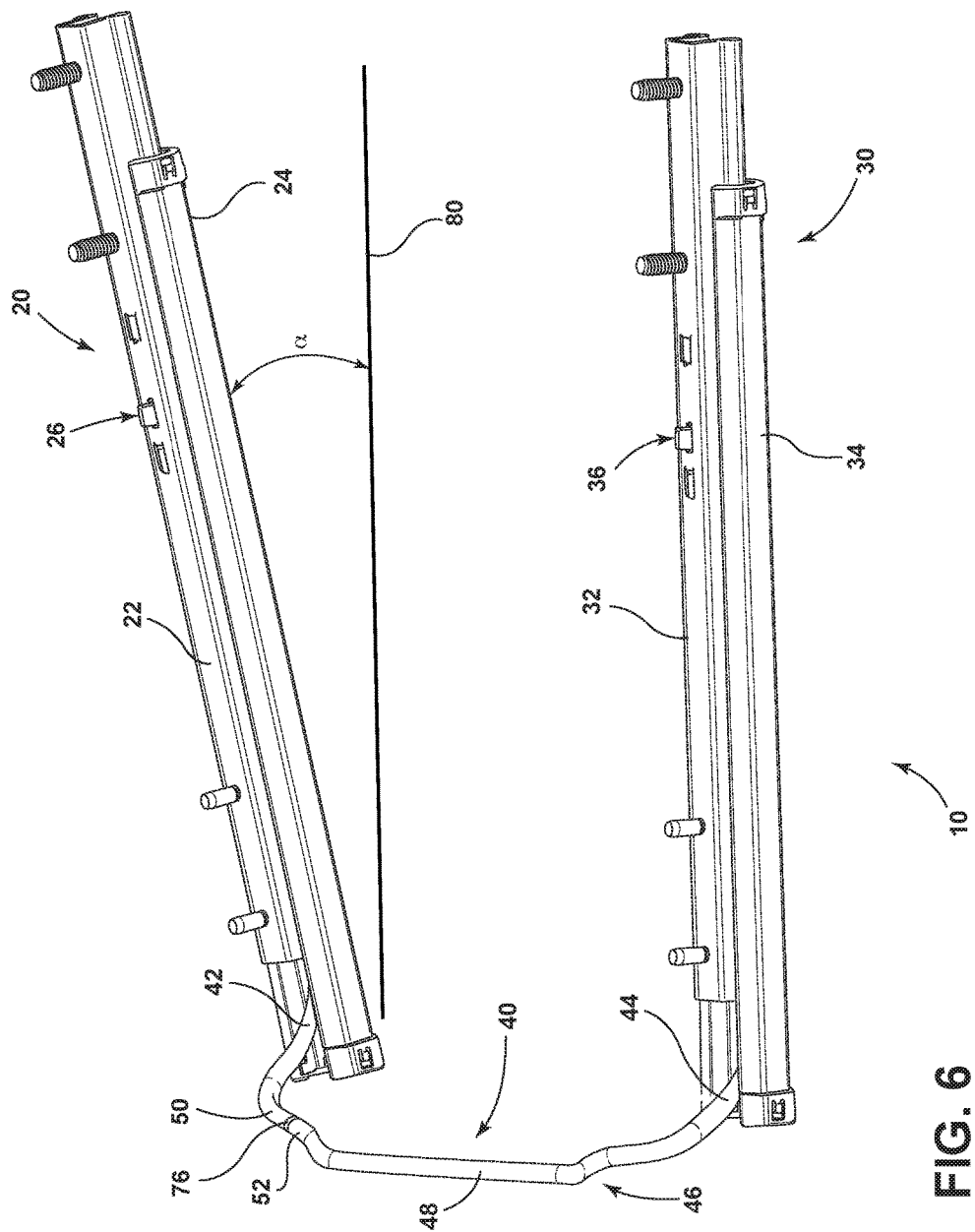
FIG. 6 is a perspective view generally illustrating an embodiment of a track assembly in accordance with teachings of the present disclosure.

In embodiments, seat assembly 10 may be subjected to irregular or uneven forces, such as during a vehicle crash, and/or if seat assembly 10 is used or installed in an uneven configuration (e.g., if a vehicle floor is not flat, such as due to tolerances). Cross member 40 may be configured to prevent movement or positioning of one pair of tracks 20, 30 from causing unlocking of the other pair of tracks 30, 20, in embodiments. For example, and without limitation, irregular or uneven forces and/or an uneven mounting surface may cause tension in seat assembly 10 and/or or cause first pair of tracks 20 to lift up or tilt relative to at least one of a mounting surface 80 and second pair of tracks 30 (see, e.g., FIG. 6). In some instances, lifting of first pair of tracks 20 may transfer/apply forces to first portion 42 of cross member 40. Cross member 40 may be configured to limit the amount of force transferred between first pair of tracks 20 and second pair of tracks 30 (e.g., from first portion 42 of cross member 40 to second portion 44 of cross member 40). For example, and without limitation, if first pair of tracks 20 tilts more than a threshold amount, first section 50 may rotate relative to second section 52 (e.g., about pin 60 and/or bearing 70) and second portion 44 may not disengage second lockset 36. A threshold amount of lifting/tilt (e.g., before first section 50 and second section 52 move relative to each other) may be an angle α of about 10 degrees or 15 degrees, for example. Limiting the amount of force transferred between first portion 42 of cross member 40 and second portion 44 of cross member 40 may prevent and/or reduce the risk of unintended unlocking of second pair of tracks 30.

With embodiments, cross member 40 may include a cover 90 that may be configured to at least partially cover cross member 40. For example, and without limitation, cover 40 may cover portions of first section 50 and second section 52 such that a connection/junction between first section 50 and second section 52 is covered.

In embodiments, cross member 40 may be split in one location (e.g., between first section 50 and second section 52) or may be split in a plurality of locations. While embodiments of cross member 40 are illustrated with a split generally on a left side of cross member 40, a split or splits may be disposed in other locations, such as, for example, at a right side or middle of cross member 40.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure. Uses of "and" and "or" are to be construed broadly (e.g., to be treated as "and/or"). For example, and without limitation, uses of "and" do not necessarily require all elements or features listed, and uses of "or" are intended to be inclusive unless such a construction would be illogical.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A track assembly, comprising:
   a first pair of tracks;
   a first lockset configured to selectively restrict movement of the first pair of tracks,
   a second pair of tracks;
   a second lockset configured to selectively restrict movement of the second pair of tracks;
   a cross member connected between the first pair of tracks and the second pair of tracks, the cross member configured to actuate the first lockset and the second lockset;
   wherein the cross member includes a first section and a second section, and the first section and the second section are configured to rotate relative to each other; and a split between the first section and the second section is disposed closer to the first pair of tracks than the second pair of tracks;
   wherein the first section is connected with the second section via a pin and a bearing, the bearing is press fit or interference fit into the first section, the pin is press fit or interference fit into the second section, and the pin is press fit or interference fit into the bearing.

2. The track assembly of claim 1, wherein the pin is press fit or interference fit at least partially in the first section and at least partially in the second section.

3. The track assembly of claim 1, wherein at least one of the first section and the second section is configured to rotate about the pin.

4. The track assembly of claim 1, wherein the first section and the second section are disposed substantially perpendicularly to a longitudinal direction, the second section includes a fourth portion and a fifth portion, and at least one of the first section, the fourth portion, and the fifth portion is offset from at least one other of the first section, the fourth portion, and the fifth portion.

5. The track assembly of claim 1, wherein the cross member extends substantially above the first pair of tracks and the second pair of tracks.

6. The track assembly of claim 1, wherein the cross member includes a first portion, a second portion, and a third portion; the third portion includes the first section and the second section; and the third portion extends above the first portion and the second portion.

7. The track assembly of claim 1, wherein the bearing includes a collar disposed at least partially between the first section and the second section.

8. A cross member, comprising:
a first portion configured to engage a first lockset of a first pair of tracks;
a second portion configured to engage a second lockset of a second pair of tracks; and
a third portion connecting the first portion and the second portion;
wherein the third portion includes a first section and a second section configured to rotate relative to each other; and a split between the first section and second section is disposed closer to one of the first pair of tracks or the second pair of tracks;
wherein the first section and the second section are connected via a pin; a wide section of the pin is press fit or interference fit in the second section; a narrow section of the pin is press fit or interference fit in a bearing; and the bearing is press fit or interference fit in the first section.

9. The cross member of claim 8, wherein the first section and the second section are configured to rotate about the pin.

10. The cross member of claim 8, wherein the first section and the second section are substantially perpendicular to the first pair of tracks and the second pair of tracks.

11. The cross member of claim 10, wherein the third portion extends substantially above the first pair of tracks and the second pair of tracks.

12. The cross member of claim 10, wherein the bearing includes a collar disposed at least partially between the first section and the second section.

13. The cross member of claim 8, wherein said first pair of tracks includes a first track and a second track; said second pair of tracks includes a third track and a fourth track, the first portion extends from between said first track and said second track, and the second portion extends from between said third track and said fourth track.

14. The cross member of claim 8, wherein the first portion, the second portion, and the third portion are substantially hollow.

* * * * *